United States Patent
Kovach et al.

(10) Patent No.: US 10,499,552 B2
(45) Date of Patent: Dec. 10, 2019

(54) TILLAGE IMPLEMENT WITH PRESET DISK FRAME ANGLE

(71) Applicant: CNH Industrial America LLC, New Holland, PA (US)

(72) Inventors: Michael G. Kovach, Morton, IL (US); Eric J. Anderson, Metamora, IL (US); Rick L. Gerber, Roanoke, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/039,717

(22) Filed: Jul. 19, 2018

(65) Prior Publication Data

US 2018/0317371 A1    Nov. 8, 2018

Related U.S. Application Data

(62) Division of application No. 14/463,800, filed on Aug. 20, 2014, now Pat. No. 10,051,773.

(60) Provisional application No. 61/868,147, filed on Aug. 21, 2013.

(51) Int. Cl.
*A01B 21/08* (2006.01)
*A01B 63/32* (2006.01)
*A01B 73/04* (2006.01)

(52) U.S. Cl.
CPC ............ *A01B 63/32* (2013.01); *A01B 21/083* (2013.01); *A01B 73/044* (2013.01)

(58) Field of Classification Search
CPC ... A01B 21/083; A01B 63/002; A01B 63/008; A01B 63/111; A01B 63/114; A01B 63/32; A01B 73/044; A01B 73/02; A01B 73/046; A01B 49/02; A01B 49/027; A01B 35/18; A01B 33/087
USPC ........ 172/145, 146, 147, 149, 152, 154, 153
See application file for complete search history.

(56) References Cited

U.S. PATENT DOCUMENTS

| | | | | |
|---|---|---|---|---|
| 5,462,123 A | * | 10/1995 | Harlan | A01B 63/32 172/454 |
| 6,276,462 B1 | * | 8/2001 | Dietrich, Sr. | A01B 49/02 172/138 |
| 6,557,646 B1 | * | 5/2003 | Hurtis | A01B 21/083 172/156 |
| 7,578,356 B2 | * | 8/2009 | Newman | A01B 21/083 172/264 |

(Continued)

*Primary Examiner* — Matthew Troutman
(74) *Attorney, Agent, or Firm* — Rebecca L. Henkel; Rickard K. DeMille

(57) ABSTRACT

An agricultural tillage implement including a carriage frame assembly and pull hitch towed by a tractor and forward and aft secondary frames supported by the carriage frame assembly. The forward and aft secondary frames mount gangs of disk blades for tilling the soil. The secondary frames establish a plane and the aft secondary frame is connected to the carriage frame assembly at a greater distance from the plane than the forward secondary frame so that the depth of penetration of the disk blades is uniform during field operation. The tillage implement has outboard wing sections pivotally connected to the secondary frames and annular shims are provided to establish the wing sections and secondary frames in common plane during field operation, the annular shim being rotatable about central axis to present a common surface to the implements irrespective of the orientation of the shims.

7 Claims, 5 Drawing Sheets

(56) References Cited

U.S. PATENT DOCUMENTS

| | | | |
|---|---|---|---|
| 9,609,797 B2 * | 4/2017 | Dietrich, Sr. | A01B 61/044 |
| 9,661,797 B2 * | 5/2017 | Kovach | A01B 61/042 |
| 2009/0090523 A1 * | 4/2009 | Newman | A01B 21/083 |
| | | | 172/570 |
| 2014/0116736 A1 * | 5/2014 | Dietrich, Sr. | A01B 61/044 |
| | | | 172/664 |
| 2015/0181797 A1 * | 7/2015 | Abbott | A01B 73/046 |
| | | | 172/568 |

* cited by examiner

TILLAGE IMPLEMENT WITH PRESET DISK FRAME ANGLE

CROSS REFERENCE TO RELATED APPLICATIONS

This is a non-provisional application based upon US non-provisional patent application U.S. Ser. No. 14/463,800, entitled, "TILLAGE IMPLEMENT WITH PRESET DISK FRAME ANGLE", filed Aug. 20, 2014, which is based upon U.S. provisional patent application Ser. No. 61/868,147, entitled "TILLAGE IMPLEMENT WITH PRESET DISK FRAME ANGLE", filed Aug. 21, 2013, both of which are incorporated herein by reference in their entirety.

BACKGROUND OF THE INVENTION

1. Field of the Invention

The present invention relates to agricultural implements, and, more particularly, to agricultural field tillage implements.

2. Description of the Related Art

Farmers utilize a wide variety of tillage implements to prepare soil for planting. Some such implements include two or more sections coupled together to perform multiple functions as they are pulled through the fields by a tractor, for example, a cultivator/harrow which is capable of simultaneously tilling and leveling the soil in preparation for planting. This implement includes a cultivator that is towed by a tractor in a harrow that is towed by the cultivator.

In one type of tilling operation, rows or gangs of circular disk blades are pulled through the soil at variable depths to break up clods or lumps of soil, as well as old plant material to provide a more amenable soil structure for planting and to level the soil surface. The gangs of disks are arranged on frames that extend generally laterally with respect to the direction of movement through a field and more particularly are angled with respect to the direction of movement. As the width of the gangs being towed by the tractor increases, there exhibits a flexing of the frame that causes the front disks to dig further into the soil than the aft disks. This produces an uneven tillage of the soil. Many attempts have been made to provide disks with dynamic leveling mechanisms in an attempt to achieve a uniform cutting depth of the disks. However, these mechanisms provide added costs owing to their complexity and add to the possibility of mechanical breakdowns during operation.

Additionally, tillage implements of the above type need to be adjusted to ensure that the tillage equipment is in a level plane across the width of its span. For larger tillage implements, wing sections are utilized and they are pivoted between a transport position for road clearance and a field operating position in which they must be level with the main section of the tillage implement. Presently, this is done with shims adjacent the articulated joint. Current shims are set up so that it is possible to have the shim be adjusted out of position with respect to its initial setting. This occurs because of vibration and other field operating conditions.

What is needed therefore in the art is a tilling implement that has uniform disk penetration during operation and reliable adjustment without additional and complicated mechanisms.

SUMMARY OF THE INVENTION

The present invention provides a tillage implement with disk blades having uniform soil penetration during field operations.

In one form, the invention is an agricultural tillage implement including a carriage frame assembly with a pull hitch extending in a travel direction. Forward and aft secondary frames extend generally laterally with respect to the travel direction. Forward and aft gangs of disk harrows are connected to and supported by the forward and aft secondary frames to till soil over which the tillage implement traverses, the depth penetration of the forward and aft gangs of disk harrows into the soil being set by the position of the forward and aft secondary frames. The aft secondary frame is positioned a greater distance from the carriage frame assembly than the forward secondary frame, whereby flexing of the tillage support frames during operation causes the forward and aft gangs of disk blades to have uniform penetration depth.

In still another form, the above agricultural tillage implement includes wing sections pivoted between a transport position and an operating position in which the planes of the wing sections are substantially that of the main section wherein an annular shim is placed adjacent the pivot point and has a preselected thickness to maintain the two sections in a common plane.

An advantage of the present invention is that the depth of the disk blades can be preset to produce uniform penetration during operation.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
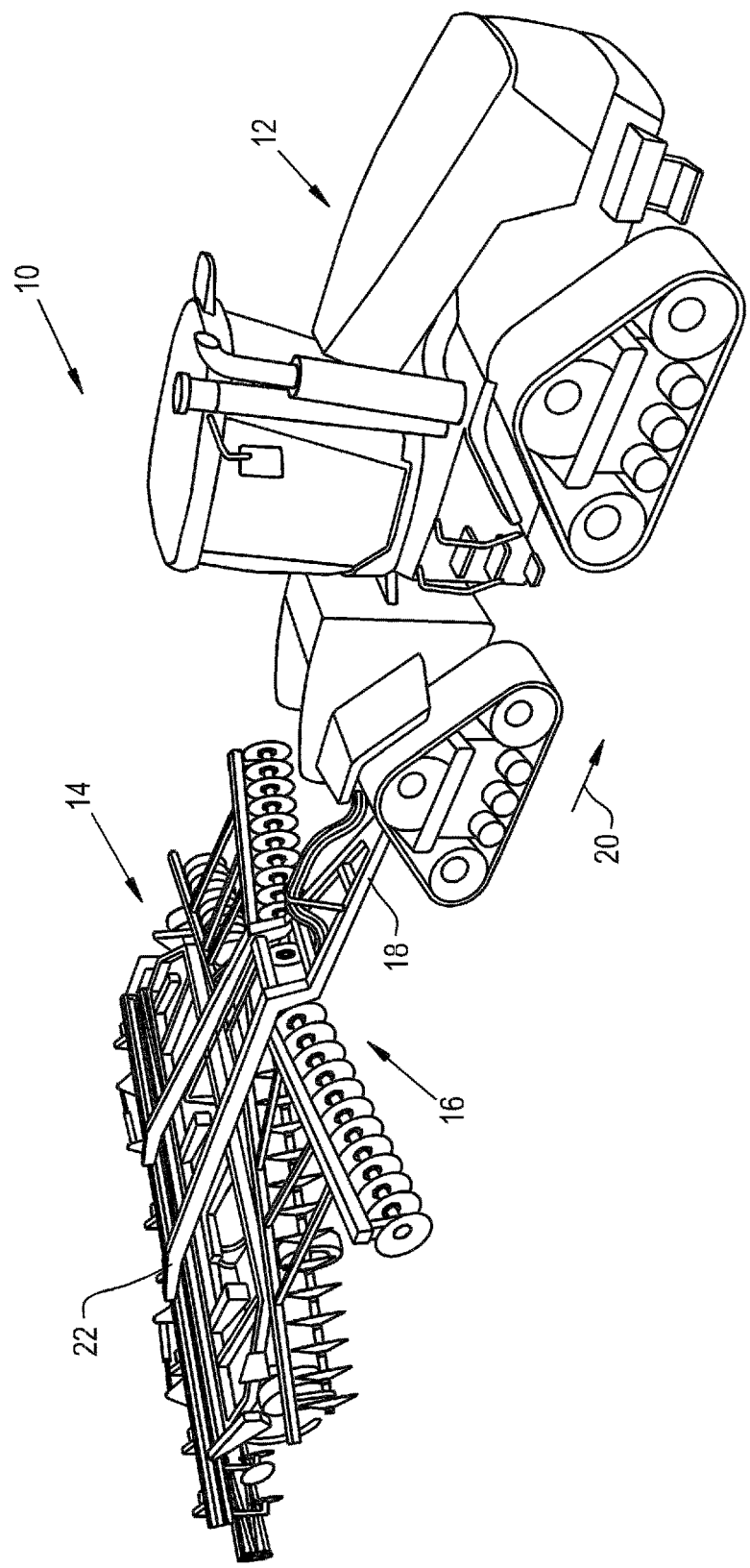
FIG. 1 illustrates a tillage implement including a support of disk blades embodying the present invention, being pulled by a tractor.

Referring now to the drawings, and more particularly to FIG. 1, there is shown a tillage apparatus 10 which generally includes a tractor 12 and an agricultural tillage implement 14 for tilling and finishing soil prior to seeding.

Figure 2:
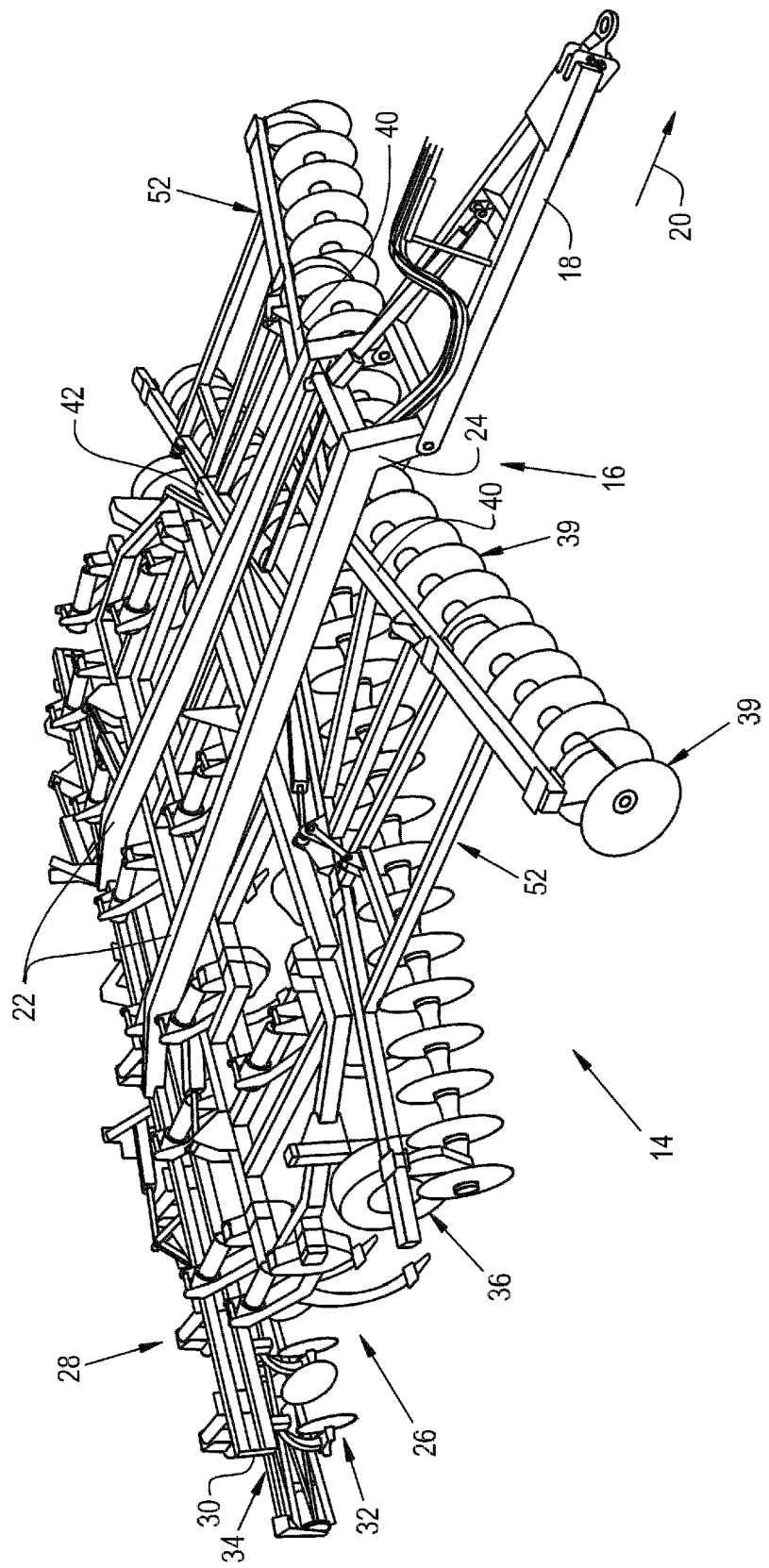
FIG. 2 is a perspective view of the tillage implement of FIG. 1.

Now, additionally referring to FIG. 2, agricultural tillage implement 14 is configured as a multi-section field disk ripper 14, and includes a carriage frame assembly 16. Carriage frame assembly 16 is the section that is directly towed by a traction unit, such as agricultural tractor 12. Carriage frame assembly 16 includes a pull hitch 18 generally extending in a travel direction 20, and forward and aft directed carrier frame members 22 which are coupled with and extend from pull hitch 18. Reinforcing gusset plates 24 may be used to strengthen the connection between pull hitch 18 and carrier frame members 22. Carriage frame assembly 16 generally functions to carry a shank frame 26 for tilling the soil, and a rear implement 28 for finishing the soil. Rear implement 28 includes a secondary frame 30, leveling blades 32 and rolling (aka, crumbler) basket assemblies 34, which co-act with each other to finish the soil in preparation for planting. Leveling blades 32 and rolling basket assemblies are both attached to secondary frame 30.

Wheels 36, only one of which is shown, are actuated from tractor 12 to raise or lower the carrier frame members 22 and 23 to place the tillage apparatus in a transport position with the wheel assemblies 36 supporting the implement above the ground and an operating position in which the tillage equipment is used to till the soil.

Figure 3:
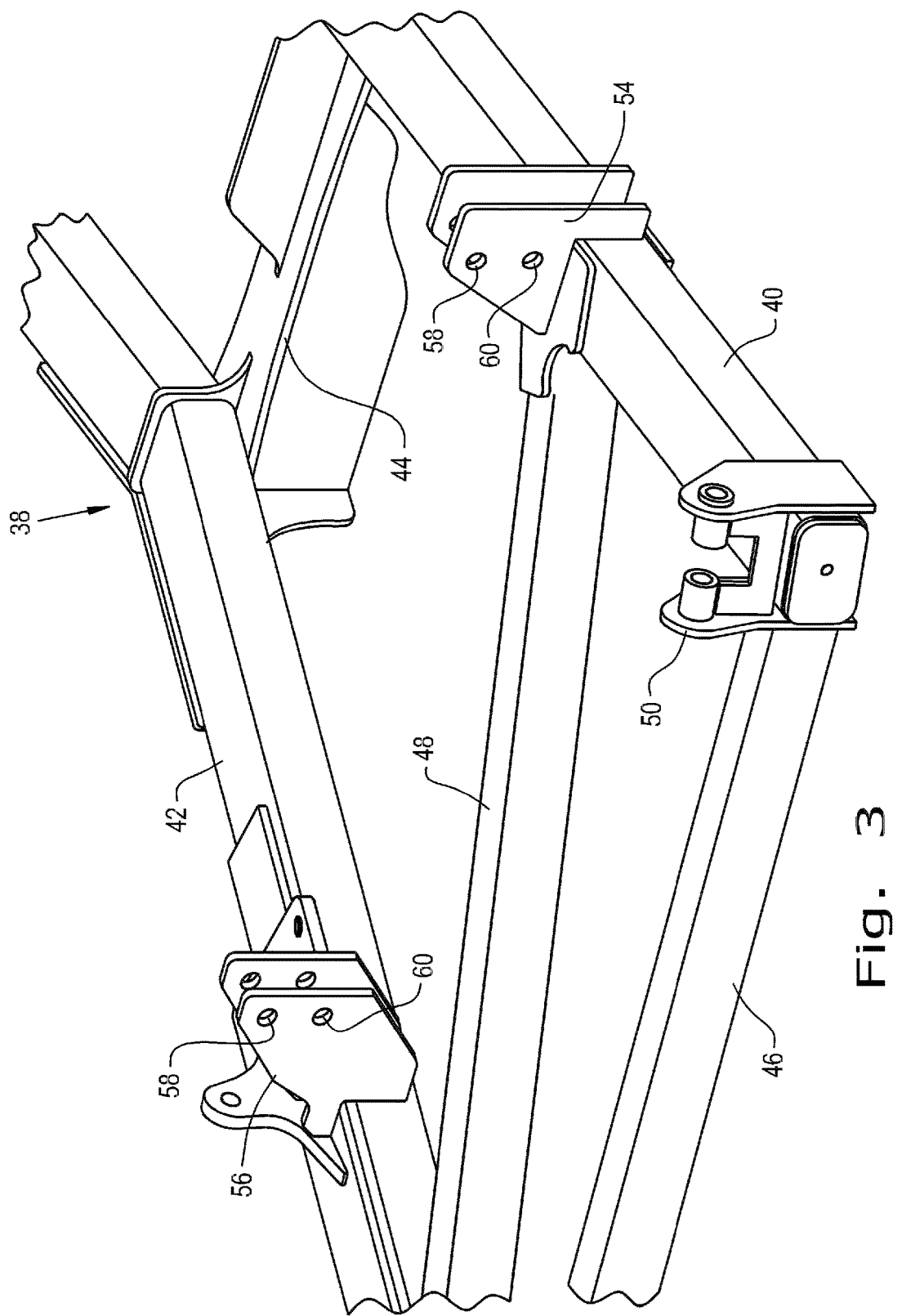
FIG. 3 is a partial perspective view of the tillage implement of FIGS. 1 and 2.

Referring now to FIG. 3, there is shown a disk frame assembly 38 which provides support for gangs of disk blades 39 shown particularly in FIG. 2. The disk frame assembly 38 includes forward and aft frame members 40 and 42, respectively. Frame members 40 and 42 are structurally interconnected by a central frame element 44 and outboard forward and aft frame members 46. A further diagonal frame member 48 reinforces the frame members and helps establish the disk frame assembly 38 in substantially a single plane when not in operation. A plurality of pivot joints 50 are positioned along outboard frame members 46 and provide pivoting support for wing sections 52, shown in particularly in FIG. 3. Wing sections 52, as described below, are pivoted between a field operating position in which they are generally horizontal with respect to the disk frame 38 and a transport position in which they are pivoted out of the plane for appropriate road clearance during the transport mode.

Figure 4:
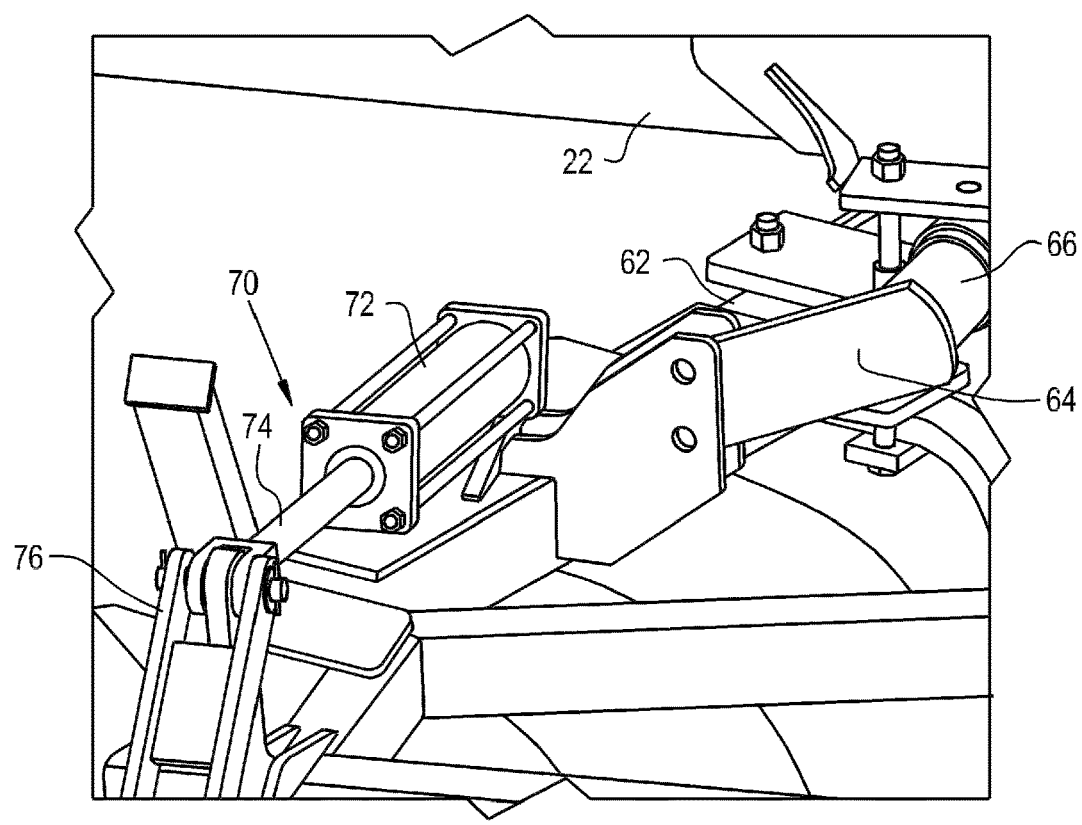
FIG. 4 is an expanded perspective view of an articulated portion of the tillage implement of FIGS. 1 and 2.

Forward and aft lift lugs 54 and 56 consisting of web members secured to forward and aft frame members 40 and 42, respectively, are provided in pairs and have upper and lower holes 58 and 60 to provide a pivotal mounting for rock shaft assemblies 62 specifically shown in FIG. 4. Only one rock shaft assembly 62 is shown in FIG. 4 to simplify the understanding of the invention. It should be apparent to those skilled in the art that rock shaft assembly 62 would be provided for each of the right and left forward and aft lift lugs 54 and 56. Rock shaft assembly 62 has an arm 64, the free end of which is pivotally connected to the lift lugs through either upper holes 58 or lower holes 60. The utilization of upper and lower holes 58 and 60 allows an operator to select disks 39 of two different diameters for appropriate tillage operation. Each arm 64 is integral with a cross shaft 66 that is appropriately journaled and supported underneath carrier frame member 22. The shafts 66 are interconnected with appropriate linkages (not shown) to cause the arms 64 of each rock shaft assembly 62 to be simultaneously pivoted through an arc which sets the ultimate depth of penetration of gangs of disk blades 39 in the soil. Details of the raising and lowering mechanism, which includes hydraulic actuators, are not shown to simplify an understanding of the present invention.

The wing sections 52 are pivoted between their field operation position and transport position by actuator assemblies 70, only one of which is shown. Actuator assembly 70 includes a cylinder 72 having an output shaft 74 which is pivotally connected to links 76 on wing frame members 52 so that they may be pivoted around pivotal connections 50.

Figure 5:
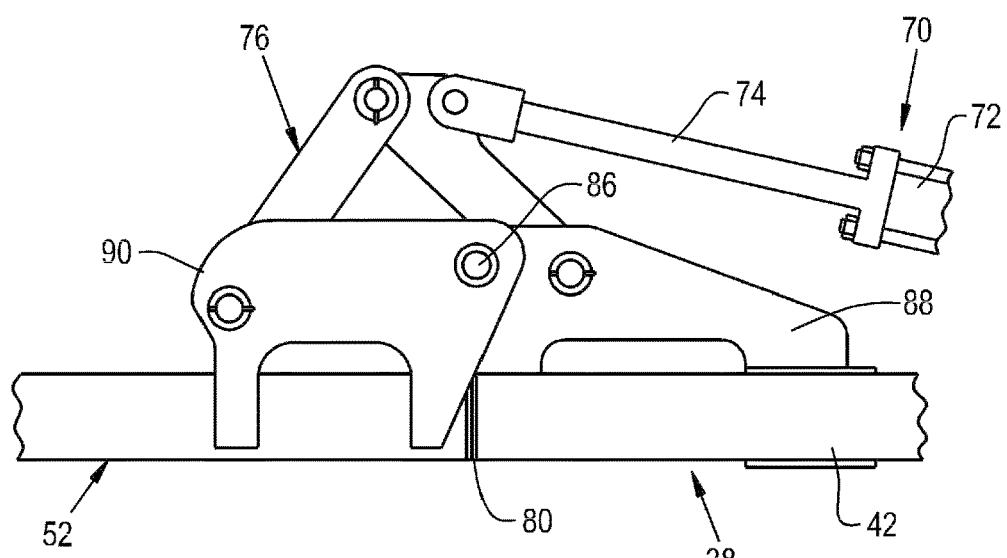
FIG. 5 is an expanded partial side view of a pivoting joint of the tillage implement of FIGS. 1-4.
Figure 6:
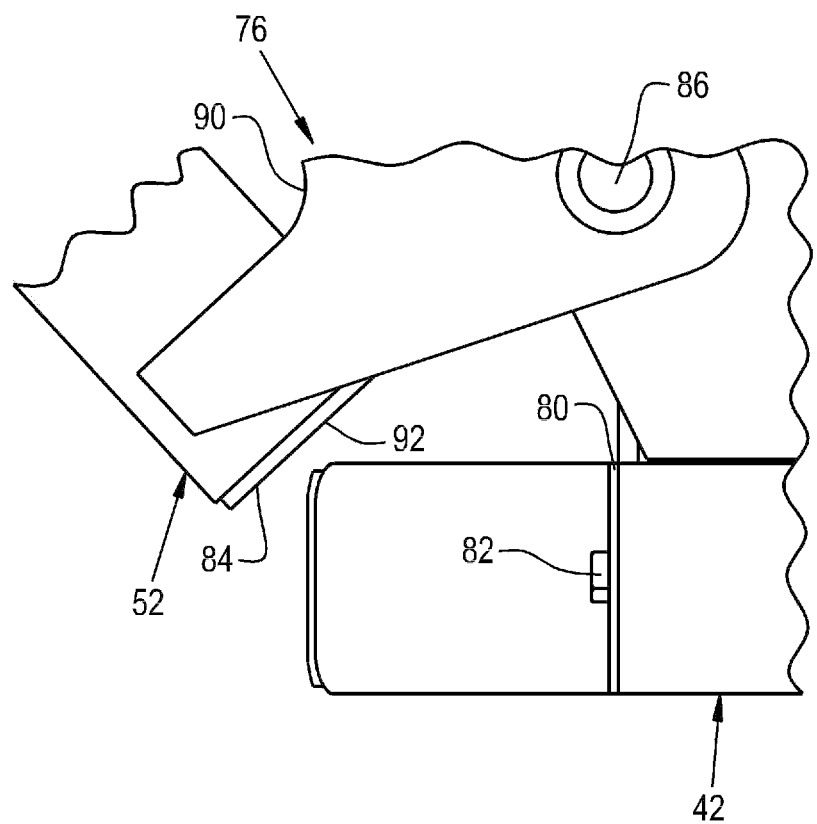
FIG. 6 is a partial view of FIG. 5 shown in a different position.

Particularly referring to FIGS. 5 and 6, the tillage implement embodying the present invention has a feature enabling leveling of the apparatus in an effective and reliable fashion. The frame element 42 and wing frame 52 are substantially in a uniform plane. The actuator is shown in the position wherein the elements 52 and the plane of frame 38 are substantially coextensive. The wing frame assembly 52 pivots about axis 86 which is connected to a frame element 88 affixed to frame 42. Linkage assembly 76 is connected to shaft 74 of actuator 70 and to wing assembly 52 through frame elements 90. As stated above, it is essential that the frame assemblies 52 and 38 are essentially coplanar in the field operating position. For this purpose, a shim 80 is positioned to abut frame element 42 and is held in place by a suitable fastener 82, shown herein as a hex head screw. A hole 92 in an end cap 84 on wing frame assembly 52 provides clearance for the fastener 82 when the assemblies 52 and 38 are in the position of FIG. 5. The annular shim 80 has a circular outer periphery so that it presents the same pattern to the end plate 84 regardless of its rotational orientation. Accordingly, vibration, which would cause previous shims to be out of alignment, does not affect shim 80, since it is secured to the frame element 42 at its central axis. As needed, shims may be placed at any or all of the pivoting joints between the wing elements 52 and the plane of frame 38.

As described above, the frame members of the tillage apparatus 10 are subjected to significant force loads, especially when the span of the tillage apparatus is greater, thus requiring a tractor 12 of greater than normal horse power. Pulling through the field causes the rearward frame members to flex and the rear frame to deflect upward which causes the front blades to run deeper than the rear blades. As the machine size is increased, these problems are exacerbated. In accordance with the present invention, the lift lugs 54 and 56 are selected so that the mounting holes 58 and 60 of the rear lift lug 56 are moved up five-eighths of an inch or 16 mm relative to the position of the holes 58 and 60 of the front lift lugs 54. This causes the gangs of disk blades 39 in the aft section to be lower than the gangs of disk blades 39 in the front section during static conditions. However, when the tillage apparatus 10 is operating in the field, the flexing of the frames described above, causes the various frame members to be deflected so that the disk blades 39 have uniform penetration of the soil. Although 16 mm has been proposed for the apparatus illustrated in the figures, it should be apparent to those skilled in the art that other differences can achieve the same results with appropriate analysis of the frame size and requirements. What results is an extremely simple but effective arrangement of the components that causes level operation during dynamic field operating conditions. The provision of this feature adds no additional complication to the overall structure, nor does it add any additional cost. As a result, it is extremely effective in producing uniform tillage of the soil.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
a carriage frame assembly including a pull hitch extending in a travel direction;
forward and aft secondary frames extending generally laterally with respect to the travel direction;
one or more frame members, each of said one or more frame members being rigidly coupled directly between said forward secondary frame and said aft secondary frame such that said one or more frame members structurally interconnect said forward and aft secondary frames;
forward and aft gangs of disks blades connected to and supported by said forward and aft secondary frames, respectively, relative to said carriage frame assembly such that said forward and aft gangs of disk blades are configured to till soil over which the tillage implement traverses, the penetration depth of said forward and aft gangs of disk blades into the soil being set by the position of said forward and aft secondary frames, and
a mechanism connected between said carriage frame assembly and said forward and aft secondary frames for varying the elevation of said forward and aft secondary frames relative to said carriage frame assembly, wherein the mechanism comprises rock shafts mounted on the carriage frame assembly and having pivotable links connected to the forward and aft secondary frames,
wherein:
the aft secondary frame is positioned a greater distance from the carriage frame assembly than the forward secondary frame such that the aft gang of disk blades is positioned further from the carriage frame assembly than the forward gang of disk blades during static conditions; and
the distance is selected such that, when one or more portions of the tillage implement flex during operation, the forward and aft gangs of disk blades have uniform penetration depth, and
wherein the one or more frame members structurally interconnect the forward and aft secondary frames to form a frame assembly disposed in substantially a uniform plane, each of said forward and aft secondary frames further including lift lugs extending out of the uniform plane and connected to a respective pivotable link of the pivotable links of said mechanism, a mounting location for coupling the lift lugs for the aft secondary frame to the respective pivotable link being positioned further away from the uniform plane than a mounting location for coupling the lift lugs for the forward secondary frame to the respective pivotable link by a distance equal to the selected distance.

2. The agricultural tillage implement of claim 1, wherein the difference in the distance between the uniform plane and the respective mounting locations associated with the forward and aft secondary frames is greater than 0 mm and less than or equal to 16 mm.

3. The agricultural tillage implement of claim 1, wherein each mounting location is defined by one of a pair of spaced holes on each corresponding lift lug, the pair of spaced holes allowing for the respective pivotable link to be connected to the corresponding one of the forward secondary frame or the aft secondary frame at one of two positions relative to the carriage frame assembly.

4. The agricultural tillage implement of claim 1, wherein the carriage frame assembly comprises a pair of forward and aft extending support frames connected to said pull hitch, said mechanism being connected to said forward and aft extending support frames.

5. The agricultural tillage implement of claim 1, wherein the pivotable links of the rock shafts are connected to said forward and aft secondary frames in a trailing arm arrangement.

6. The agricultural tillage implement of claim 1, wherein the one or more frame members structurally interconnect the forward and aft secondary frames to form a frame assembly disposed in substantially a uniform plane.

7. The agricultural tillage implement of claim 1, wherein the one or more frame members comprise a central frame member coupled between said forward and aft secondary frames and one or more outboard frame members coupled between said forward and aft secondary frames.

* * * * *